United States Patent

[11] 3,620,355

[72] Inventors Morris C. Jones, Jr.;
Gary Eugene La Pan, both of Saginaw, Mich.
[21] Appl. No. 871,869
[22] Filed Oct. 28, 1969
[45] Patented Nov. 16, 1971
[73] Assignee Baker Perkins Inc.
Saginaw, Mich.

[54] CORNER CONVEYOR
7 Claims, 6 Drawing Figs.
[52] U.S. Cl. .................................................. 198/182
[51] Int. Cl. ............................................. B65g 15/02
[50] Field of Search .................................... 198/181, 182, 189

[56] References Cited
UNITED STATES PATENTS

| | | | |
|---|---|---|---|
| 2,150,320 | 3/1939 | Edwards.................... | 198/182 X |
| 2,652,143 | 9/1953 | Doren ........................ | 198/182 |

Primary Examiner—Edward A. Sroka
Attorney—Learman, Learman & McCulloch

ABSTRACT: A corner conveyor for transferring articles between two endless conveyors, which generally extend at right angles to each other. The conveyor includes a pair of endless chains journaled around sprockets mounted on a pair of shafts which generally extend at right angles to each other. Upper and lower, nonparallel, curvilinear, guides are provided for guiding the upper and lower runs respectively, of each endless chain. The curvature of the lower guide is greater than that of the upper guide.

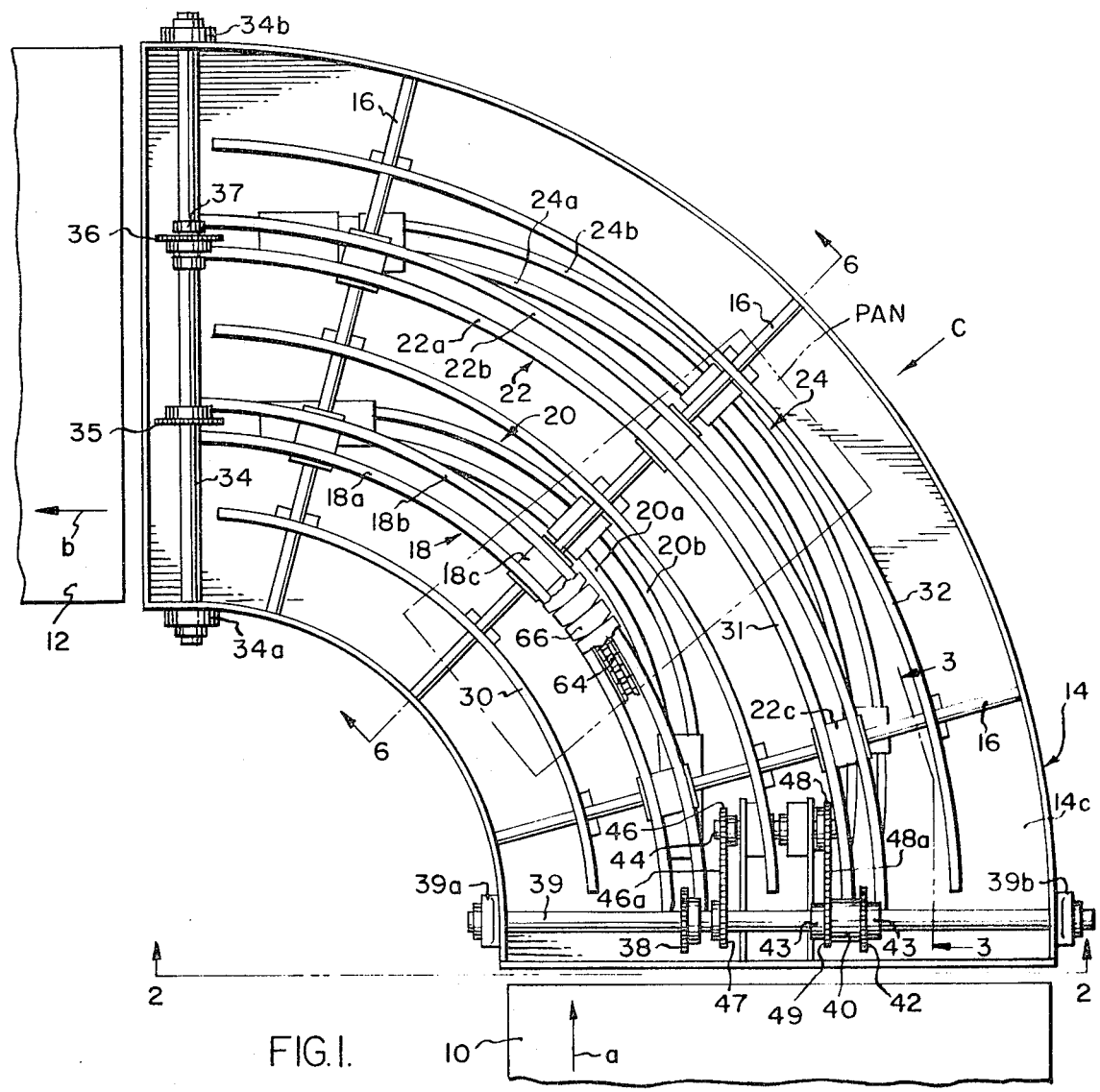
FIG.1.
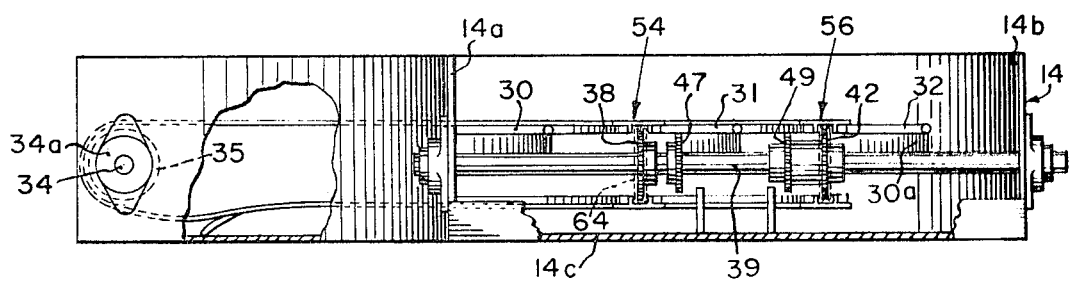
FIG.2.
INVENTORS
MORRIS C. JONES JR.
GARY E. LAPAN
BY

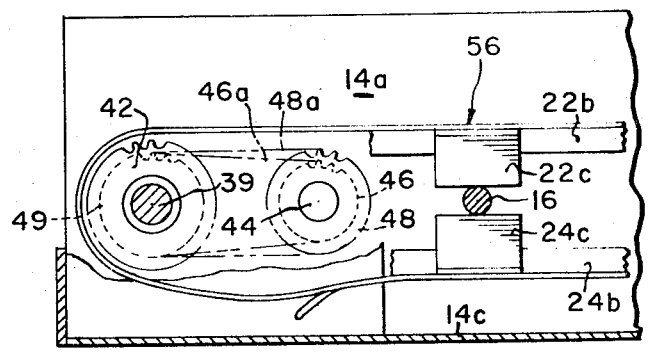
FIG. 3.
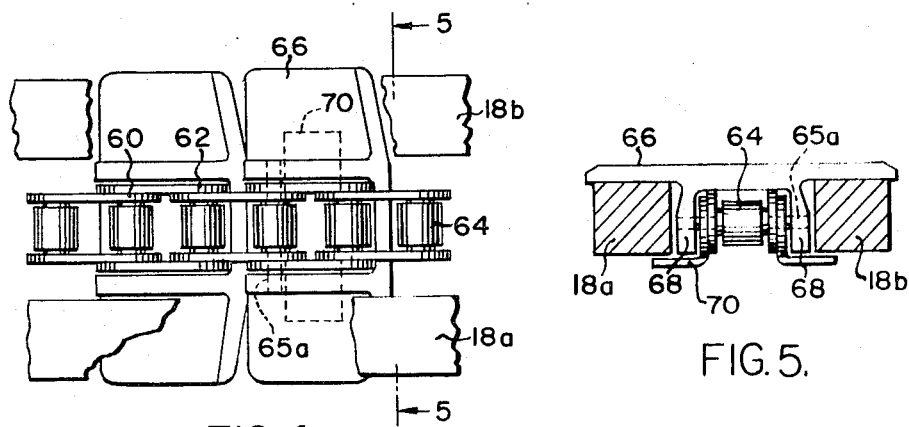
FIG. 4.
FIG. 5.
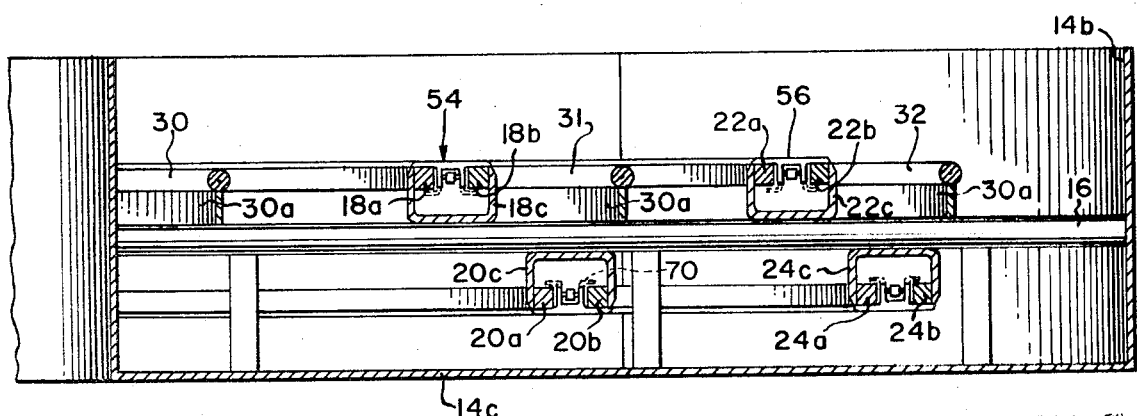
FIG. 6.

CORNER CONVEYOR

This invention relates to conveyors and more particularly to corner conveyors for transferring articles between a pair of endless conveyors which extend at right angles to each other.

In the bakery processing art, it is conventional to transfer baking pan sets from one processing operation to another by means of endless conveyors. These conveyors often extend angularly relative to each other and, thus, apparatus must be provided to transfer the pan sets therebetween.

It is an object of the present invention therefore to provide a conveyor which will transfer an article between two angularly extending conveyors without changing the orientation of the article to the path of travel.

It is another object of the present invention to provide corner conveyor apparatus for conveying an article between angularly extending conveyors and which can be operated at relatively high speeds without malfunctioning.

It is a further object of the present invention to provide an endless chain, corner conveyor which has fixed drive and idler shafts and which has eliminated the need for a conventional, mechanical chain, takeup device.

Briefly, the present invention provides for a conveyor including endless chain conveying means for transferring an article from one endless conveyor to an angularly extending endless conveyor, and upper and lower curvilinear chain guide means for guiding the upper and lower runs, respectively, of the endless chain conveyor means. The upper and lower chain guide means are in nonparallel, vertically spaced relation and the lower guide means has a greater curvature than the upper guide means.

Other objects and advantages of the present invention will become apparent to those of ordinary skill in the art by the following description when considered in relation to the accompanying drawings in which:

FIG. 1 is a top plan view illustrating conveyor apparatus formed according to the invention;

FIG. 2 is a front-elevational view taken along the line 2—2 of FIG. 1, parts being broken away to more clearly illustrate the invention; pp FIG. 3 is a fragmentary, sectional side view, taken along the line 3—3 of FIG. 1;

FIG. 4 is an enlarged fragmentary top plan view illustrating a portion of the lower run of the conveyor chain;

FIG. 5 is a sectional front-elevational view taken along the line 5—5 of FIG. 4; and FIG. 6 is an enlarged fragmentary, cross-sectional view, taken along the line 6—6 of FIG. 1.

Apparatus constructed according to the disclosed embodiment of the invention is adapted for use with a pair of endless conveyor systems, generally designated 10 and 12, which are shown located at right angles relative to each other. In order to transfer an article between the conveyors 10 and 12 and yet maintain the same orientation of the article relative to the path of travel, a corner conveyor, generally designated C, is provided which includes a generally U-shaped frame 14 having an inside vertically extending side wall 14a, an outside vertically extending wall 14b, and a bottom wall 14c spanning the lower ends of the sidewalls 14a and 14b. As shown in FIG. 1, the frame 14 is curvilinear in nature and extends from a point adjacent the conveyor 10 through a 90° turn to a point adjacent the conveyor 12. Spanning the side walls 14a and 14b at a plurality of angularly spaced apart points are cross members 16 for supporting tip and bottom inside curvilinear guide members 18 and 20, respectively, and top and bottom outside curvilinear guide members 22 and 24, respectively. The top outside guide member 22 includes a pair of laterally spaced apart tracks 22a and 22b (FIG. 6) mounted on the cross members 16 by means of a supporting bracket 22c. The remaining guide members 18, 20 and 24, include similar spaced apart tracks mounted in a similar manner and corresponding parts are designated with corresponding subscripts.

As can be best seen in FIG. 1, the lower curvilinear guide member 20 is not parallel with the upper curvilinear guide 18 and similarly the lower guide member 24 is not parallel with the upper guide member 22. The curvilinear lower guide 20 is formed to have a greater curvature than the upper guide 18 and the lower outside curvilinear guide 24 has a greater curvature than the upper outside curvilinear guide 22. Also mounted on the cross members 16 by suitable supports 30a at a level substantially the same as the level of the upper surfaces of upper guide members 18 and 22 are a plurality of curvilinear, laterally spaced apart pan support members 30, 31 and 32.

Spanning the frame wall members 14a and 14b adjacent the end of conveyor 12 is a shaft 34 journaled in bearing blocks 34a and 34b and having a sprocket 35 fixed thereto in any conventional manner such as a key (not shown). Spaced laterally outwardly of the sprocket 35 is a sprocket 36 fixed to a bushing 37 journaled on the shaft 34. Spanning the walls 14a and 14b at the opposite end of the corner conveyor adjacent the conveyor 10 is a perpendicular shaft 39 journaled in bearing blocks 39a and 39b. Fixed to the shaft 13 by any suitable means such as keys, are a conveyor chain driving sprocket 38, and a shaft-driving sprocket 47. A collar 40, journaled on the shaft 39, mounts another conveyor chain-driving sprocket 42 and a collar-driving sprocket 49. A pair of stops 43 are mounted on opposite sides of the collar to prevent its axial movement on the shaft C39. The sprockets 38 and 42 are driven from a common power source (not shown), such as an electric motor, connected with a shaft 44 having sprockets 46 and 48 fixed on opposite ends thereof, with a chain 46a trained around the sprockets 46 and 47 and a chain 48a trained around the sprockets 48 and 49. As shown in the drawings, the sprocket 46 is of smaller diameter than sprocket 48 and includes fewer teeth than the sprocket 48 so that the sprocket 42 will rotate at a faster angular velocity than will the sprocket 38.

Trained around the inside set of sprockets 35 and 38 and the outside set of sprockets 36 and 42 are a pair of endless roller chain members generally designated 54 and 56 respectively. Referring more particularly to FIGS. 4 and 5, the endless conveyor chain 54 includes a plurality of links 60 pivotally connected by side link members 62 and mounting sprocket engaging rollers 64, on a plurality of pivot pins 65. Each pin 65 extends outwardly of the link members 62 as shown at 65a and pairs of pins 65 each carry a top plate 66 having a pair of laterally spaced apart side bars 68 which are bored to receive the ends 65a of the pins 65. The top plates 66 serve to support articles being transferred between the conveyors 10 and 12. Each side link member 62 includes an extension pad 70 (shown in dotted lines in FIG. 4) extending laterally outwardly of the side bars 68 and engageable with the upper chain engaging surfaces of the guides or tracks 18a and 18b and the lower chain engaging surfaces of the guides or tracks 20a and 20b. It should be understood, of course, that the endless conveyor chain 56 is similarly formed and corresponding parts will be referred to with corresponding numerals.

The runs of the endless conveyor chains 54 and 56 are guided between the sprockets 35, 38 and sprockets 36 and 42, by the inner curvilinear guide members 18 and 20 and the outer curvilinear guide members 22 and 24 respectively. Thus, the chain conveyor members 54 and 56 each have a lower run which is not parallel with its upper run and the lower run of each conveyor chain is caused to have a greater curvature and accordingly will be of greater length than the upper run since they are forced to take this position by the guides 20 and 24. Because of the larger sprocket 48 driving the sprocket 42, the outer sprocket 42 will drive the outer chain 56 at a predetermined higher lineal speed than the sprocket 38 will drive the chain 54. In this manner, the pans will thus be disposed broadside to their path of travel as they pass around the turn without being displaced in position.

The design of the chain guides 18, 20, 22 and 24 thus facilitates the proper infeed and discharge of the conveyor chains while permitting the drive shaft 39 and the idler shaft 34 to remain in a fixed position, thus, eliminating the need for a mechanical chain takeup device. The design of the guides or tracks permits the shafts 34 and 39 to be located horizontally and at right angles relative to each other, and eliminates the need for straight sections that would tend to angularly displace the pan during its movement from conveyor 10 to conveyor 12.

In operation, assuming the endless conveyors 10 and 12 to be moving the pans in the direction of arrows *a* and *b* respectively, and that articles are being delivered to the conveyor C by the conveyor 10, the motor for the drive shaft 42 will be energized and the sprockets 49, 42 and 36, will be driven at a higher angular velocity than will sprockets 38, 47 and 35. The outer conveyor chain 56 has a sufficiently higher lineal velocity than the inside conveyor chain 54 to compensate for the face of its greater length. The outer ends of the pans are moved at a slightly greater lineal velocity so predetermined with respect to the velocity of travel of the inner ends of the pans that no disorientation occurs. As articles are passed from the conveyor 10 to the corner conveyor C, they will be received on and driven by the top plates 66. The articles will also receive vertical support from the members 30, until they are passed to a position adjacent the shaft 34 where they will be discharged onto the discharge conveyor 12. The upper runs of the chains 54 and 56 will be guided by the guide 18 and 22 respectively, and the lower runs of the chains 54 and 56 will be guided along a longer return path by the lower guides 20 and 24 respectively. With the present structure greater speeds of travel are possible than formerly without destroying the conveying chains. The chain guide tracks are shaped to insure the proper infeed and discharge of the conveying chains.

I claim:

1. A conveyor comprising:
   endless conveyor member means for conveying articles between angularly extending conveyors and including upper and lower runs; and
   vertically spaced upper and lower curvilinear guide means disposed out of vertical alignment for guiding said upper and lower runs, respectively, in different curvilinear paths between said angularly extending conveyors, the curvature of said lower run being greater than the curvature of said upper run.

2. A conveyor as set forth in claim 1 wherein said endless member means includes endless chains trained around sprockets mounted on generally horizontally extending shafts which extend angularly relative to each other.

3. The conveyor of claim 2 including means for driving said endless chains at different linear velocities so that the orientation of Nhe article relative to its path of travel remains substantially constant.

4. A conveyor as set forth in claim 2 wherein each of said upper and lower curvilinear guide means includes a pair of laterally spaced apart tracks for each of the upper and lower runs respectively of the pair of endless chains.

5. A conveyor as set forth in claim 2 wherein the shafts extend substantially normal to each other.

6. A conveyor as set forth in claim 5 including a plurality of stationary curvilinear pan support bars mounted just below the level of the upper runs of said endless chains.

7. A conveyor comprising:
   endless conveyor means for conveying articles between angularly extending conveyors and including first and second oppositely traveling conveyor runs; and
   first and second curvilinear guide means, having different curvatures, for guiding said first and second runs, respectively, in different curvilinear paths between said angularly extending conveyors.

* * * * *